(12) United States Patent
Hwang

(10) Patent No.: US 8,317,418 B2
(45) Date of Patent: Nov. 27, 2012

(54) FOCAL PLANE SHUTTER AND IMAGING APPARATUS INCLUDING THE SAME

(75) Inventor: Jae-jung Hwang, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 12/979,517

(22) Filed: Dec. 28, 2010

(65) Prior Publication Data

US 2011/0158635 A1    Jun. 30, 2011

(30) Foreign Application Priority Data

Dec. 31, 2009   (KR) .................. 10-2009-0136221

(51) Int. Cl.
*G03B 9/40* (2006.01)
(52) U.S. Cl. ..................... 396/488; 396/489
(58) Field of Classification Search .......... 396/443, 396/454, 456, 466, 483, 489, 490, 491, 484, 396/488

See application file for complete search history.

(56) References Cited

U.S. PATENT DOCUMENTS

| | | | | |
|---|---|---|---|---|
| 3,852,786 A * | 12/1974 | Onda et al. | ..................... | 396/454 |
| 4,326,786 A * | 4/1982 | Uchiyama et al. | ............ | 396/456 |
| 6,123,467 A * | 9/2000 | Shimada | ........................ | 396/452 |
| 6,783,287 B2 * | 8/2004 | Kudo et al. | ..................... | 396/456 |
| 2011/0150457 A1 * | 6/2011 | Chung et al. | ................... | 396/456 |
| 2011/0255857 A1 * | 10/2011 | Okutani | ......................... | 396/466 |

\* cited by examiner

*Primary Examiner* — W. B. Perkey
(74) *Attorney, Agent, or Firm* — Drinker Biddle & Reath LLP

(57) ABSTRACT

An imaging apparatus includes a focal plane shutter that has a simple mechanical structure, is easily manufactured and controlled, and provides a live view function. The focal plane shutter includes: a front curtain assembly including two or more front curtain links and two or more front curtain blades, wherein bosses are formed at one of the front curtain links and the front curtain blades, holes are formed in the remaining one of the front contain links and the front curtain blades, and the bosses are inserted into the holes; and a rear curtain assembly including two or more rear curtain links and two or more rear curtain blades, wherein bosses are formed at one of the rear curtain links and the rear curtain blades, holes are formed in the remaining one of the rear curtain links and the rear curtain blades, and the bosses are inserted into the holes.

26 Claims, 8 Drawing Sheets

FOCAL PLANE SHUTTER AND IMAGING APPARATUS INCLUDING THE SAME

CROSS-REFERENCE TO RELATED PATENT APPLICATION

This application claims the priority benefit of Korean Patent Application No. 10-2009-0136221, filed on Dec. 31, 2009, in the Korean Intellectual Property Office, the disclosure of which is incorporated herein in its entirety by reference.

BACKGROUND

1. Field of the Invention

Embodiments relate to a focal plane shutter and an imaging apparatus including the same, and more particularly, to a focal plane shutter which has a simple mechanical structure, is easily manufactured and controlled, and provides a live view function, and an imaging apparatus including the focal plane shutter.

2. Description of the Related Art

Digital single lens reflex (DSLR) cameras which produce images at a professional level have recently been widely used. DSLR cameras are SLR cameras capable of taking digital pictures.

The term 'SLR' refers to a method of transmitting light bouncing off an object through a single lens either to a viewfinder or to a sensor that may record an image. Commonly used consumer-grade digital cameras are twin lens reflect cameras. Accordingly, an image that may be seen through a viewfinder of a consumer-grade digital camera is different from an image captured by the consumer-grade digital camera.

In a conventional SLR camera, a mirror is placed on an optical axis of a lens to rotate about the optical axis within a predetermined angular range. Under normal conditions, light obtained from the lens is reflected by the mirror, and an image of an object is formed on a focus plate. Thus, a photographer may view the image of the object by using a pentaprism and a viewfinder. In this case, if a shutter-release signal is input, the mirror rotates about a shaft within the predetermined angular range and raises from the optical axis of the lens. Thus, the mirror retreats from the optical axis of the lens. When a shutter is opened under the control of a shutter driving circuit, the image of the object is formed on an imaging device.

In such an SLR camera, the shutter for allowing light to pass for a predetermined period of time is provided in front of the imaging device. The shutter, which is disposed in front of the imaging device, is referred to as a focal plane shutter.

However, a conventional focal plane shutter is connected to a quick return system of the SLR camera and thus has a complicated mechanical structure. As a result, it is not easy to manufacture and control such a conventional focal plane shutter.

Meanwhile, since a lens for use in a DSLR camera may be interchanged with standard lenses which are used in the SLR camera or lenses designed exclusively for digital cameras, suitable lenses may be selectively used according to the preference or objective of a user. Also, since the DSLR camera generally has an imaging device much bigger than that of other conventional digital cameras, occurrence of noise may be prevented under low illumination conditions and a more precise image may be captured.

However, since the mirror is located to cover the imaging device, an image cannot be seen on a liquid crystal display (LCD) during shooting, that is, a live view function is not offered, and the LCD of the DSLR camera may only be used to perform menu manipulation and an image review following image capture. That is, since an image should be seen through an optical viewfinder, the field of view is limited and scenes at various angles including a small angle and a large angle are hidden. Also, when a subject should be looked at furtively for a long time and instantaneously photographed, the DSLR camera is too heavy to hold for a long time in the same position.

SUMMARY

Embodiments include a focal plane shutter that has a simple structure, is easily controlled, and offers a live view function, and an imaging apparatus including the focal plane shutter.

According to an embodiment, a focal plane shutter includes: a front curtain assembly including two or more front curtain links and two or more front curtain blades, wherein bosses are formed at one of the front curtain links and the front curtain blades, holes are formed in the remaining one of the front contain links and the front curtain blades, and the bosses are inserted into the holes; and a rear curtain assembly including two or more rear curtain links and two or more rear curtain blades, wherein bosses are formed at one of the rear curtain links and the rear curtain blades, holes are formed in the remaining one of the rear curtain links and the rear curtain blades, and the busses are inserted into the holes.

Rotation paths of the bosses formed in the front curtain assembly may not overlap with one another, and rotation paths of the bosses formed in the rear curtain assembly may not overlap with one another.

An escape groove may be formed in at least one of the front curtain blades in such a manner that the rotation paths of the bosses formed in the front curtain assembly do not overlap with one another as at least one of the bosses inserted into the holes of the front curtain blade not having the escape groove escape into the escape groove as the bosses rotate along paths about through-holes of the front curtain links at which the bosses are respectively formed, and an escape groove may be formed in at least one of the rear curtain blades in such a manner that the rotation paths of the bosses formed in the rear curtain assembly do not overlap with one another as at least one of the bosses inserted into the holes of the rear curtain blade not having the escape groove escape into the escape groove as the bosses rotate along paths about through-holes of the rear curtain links at which the bosses are respectively formed.

The front curtain assembly and the rear curtain blades may be independently driven.

According to another embodiment, a focal plane shutter includes: a front curtain assembly including two or more front curtain links having surfaces on which a plurality of bosses are formed and two or more front curtain blades having surfaces in which a plurality of holes are formed, wherein the bosses are inserted into the holes; and a rear curtain assembly including two or more rear curtain links having surfaces on which a plurality of bosses are formed and two or more rear curtain blades having surfaces in which a plurality of holes are formed, wherein the bosses are inserted into the holes, the two or more front curtain blades are disposed on different planes in such a manner that rotation paths of the two or more front curtain blades do not overlap with one another, and the two or more rear curtain blades are disposed on different planes in such a manner that rotation paths of the two or more rear curtain blades do not overlap with one another.

The front curtain assembly may include a first front curtain blade and a second front curtain blade which are disposed parallel to each other, and a first front curtain link and a second front curtain link which are disposed parallel to each other.

A plurality of bosses formed on the first front curtain link may be inserted into holes formed in the first front curtain blade and holes formed in the second front curtain blade, and a plurality of bosses formed on the second front curtain link may be inserted into holes formed in the first front curtain blade and holes formed in the second front curtain blade.

Chamfered portions may be formed at one or more edges of the first front curtain blade.

An escape groove may be formed in the second front curtain blade.

The escape groove may be formed in a portion of the second front curtain blade where the first front curtain blade rotates.

The escape groove may be formed along rotation paths of the bosses of the first front curtain link inserted into the holes of the first front curtain blade and the bosses of the second front curtain link inserted into the holes of the first front curtain blade, so that the bosses of the first front curtain link and the bosses of the second front curtain link do not contact the second front curtain blade.

The first front curtain link and the second front curtain link may rotate by a same angle.

The first front curtain blade, the second front curtain blade, the first front curtain link, and the second front curtain link may constitute a 4-bar mechanism.

The focal plane shutter may further include a buffer member formed to contact at least one of the front curtain blades, wherein a protrusion is formed at one end portion of at least one of the front curtain blades to contact the buffer member.

The focal plane shutter may further include: a cam that controls the front curtain assembly and the rear curtain assembly to independently move; a front curtain lever interposed between the front curtain assembly and the cam, and designed to transmit a movement of the cam to the front curtain assembly; and a rear curtain lever interposed between the rear curtain assembly and the cam, and designed to transmit a movement of the cam to the rear curtain assembly.

The front curtain lever and the rear curtain lever may independently rotate according to a rotation of the cam.

The cam may include a front curtain controller and a rear curtain controller having a height difference therebetween, wherein the front curtain controller controls a position of the front curtain lever and the rear curtain controller controls a position of the rear curtain lever.

The cam may rotate in one direction, and while the cam rotates, the front curtain assembly may open or close the shutter according to relative positions of the front curtain controller and the front curtain lever, and the rear curtain assembly may open or close the shutter according to relative positions of the rear curtain controller and the rear curtain lever.

The cam may include a front curtain controller having a fan shape with a first central angle, and a rear curtain controller having a fan shape with a second central angle.

The first central angle of the front curtain controller and the second central angle of the rear curtain controller may be different from each other.

The front curtain controller and the rear curtain controller may be formed to have a height difference therebetween, and respectively control rotations of the front curtain assembly and the rear curtain assembly.

From among the front curtain controller and the rear curtain controller having the height difference therebetween, the front curtain controller may contact the front curtain lever and the rear curtain controller may contact the rear curtain lever.

While the front curtain lever contacts an arc portion of the front curtain controller, the front curtain lever may be fixedly supported without rotating, and while the rear curtain lever contacts an arc portion of the rear curtain controller, the rear curtain lever may be fixedly supported without rotating.

A front curtain magnet may be further formed at one side of the front curtain lever, and while the front curtain lever contacts an arc portion of the front curtain controller, the front curtain lever may contact the front curtain magnet, and a rear curtain magnet may be further formed at one side of the rear curtain lever, and while the rear curtain lever contacts an arc portion of the rear curtain control unit, the rear curtain lever may contact the rear curtain magnet.

The focal plane shutter may further include a motor that provides a predetermined driving force, wherein the cam rotates in one direction due to the driving force provided by the motor.

A worm drive may be coupled to the motor, grooves engaged with the worm drive may be formed at regular intervals in an outer circumferential surface of the cam, and the driving force of the motor may be converted into a force to rotate the cam.

According to another embodiment, an imaging apparatus includes: a lens on which light is incident; an imaging device which converts the incident light into an electrical signal; a display unit on which an image captured by the imaging device is displayed; and the focal plane shutter, the focal plane shutter being interposed between the lens and the imaging device and designed to adjust the amount of light incident on the imaging device.

BRIEF DESCRIPTION OF THE DRAWINGS

The above and other features and advantages will become more apparent by describing in detail exemplary embodiments with reference to the attached drawings in which.

DETAILED DESCRIPTION

Exemplary embodiments will now be described more fully with reference to the accompanying drawings.

Figure 1:
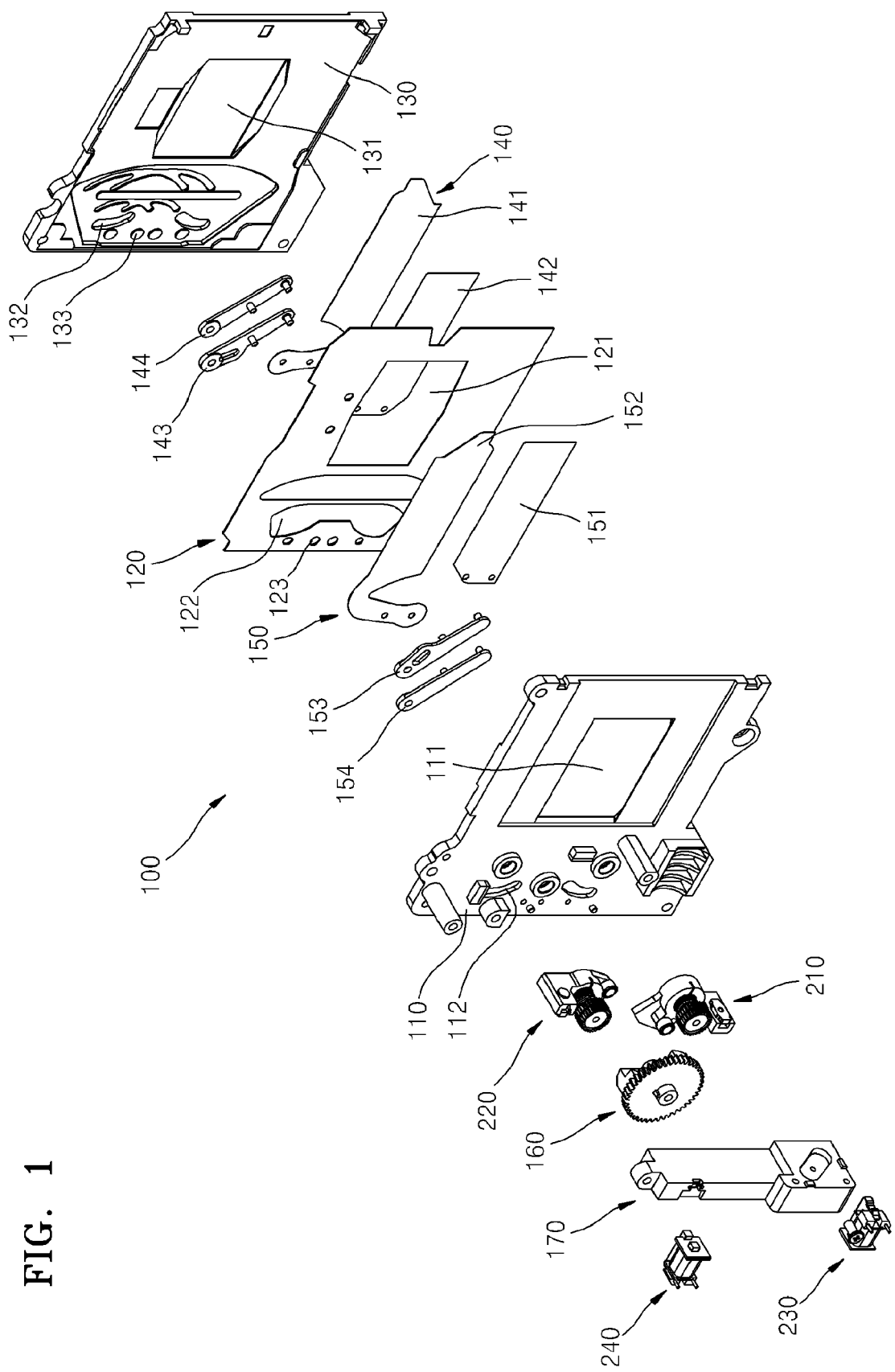
FIG. 1 is an exploded perspective view of a focal plane shutter, according to an embodiment.
Figure 2:
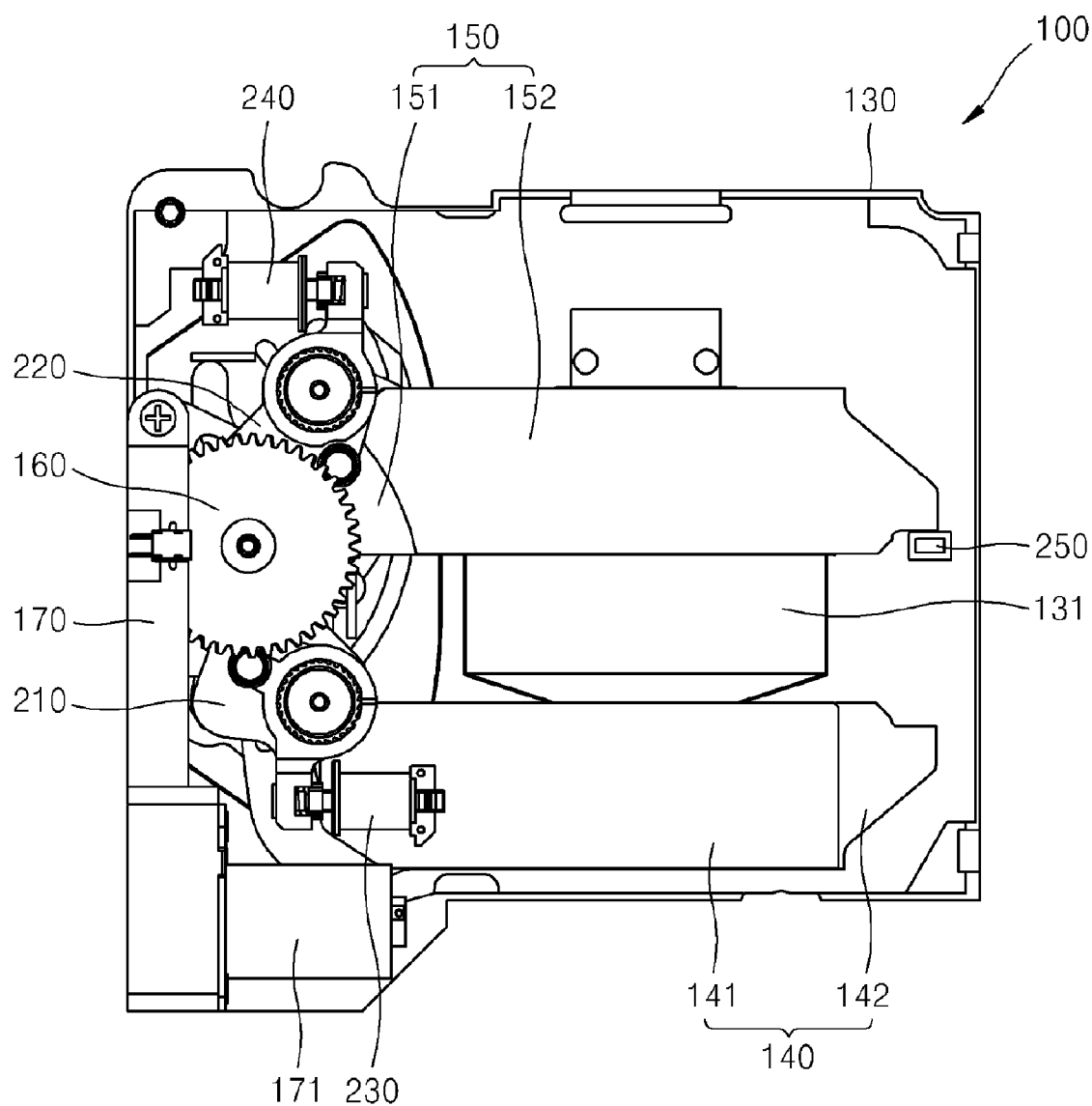
FIG. 2 is a plan view of the focal plane shutter of FIG. 1, according to an embodiment.

FIG. 1 is an exploded perspective view of a focal plane shutter 100, according to an embodiment. FIG. 2 is a plan view of the focal plane shutter 100 of FIG. 1, according to an embodiment. A base plate 110 and an intermediate plate 120 illustrated in FIG. 1 are not shown in FIG. 2.

In general, a focal plane shutter is a horizontal or vertical travel shutter which usually includes two cloths or metal curtains installed in front of a focal surface of a lens, and allows a photosensitive material to be exposed to a proper amount of light by controlling a slit between a front curtain and a rear curtain or the moving speed of the front curtain and the rear curtain.

Focal plane shutters having a size of 6×6 cm or less are often used in cameras. Focal plane shutters determine an exposure time by adjusting only the width of a slit by using a speed regulator or an electrically controlled electromagnet while maintaining a shutter blind speed constant. Thus, interchangeable lenses can be used and a high speed can be obtained.

Referring to FIGS. 1 and 2, the focal plane shutter 100 includes a cover plate 130, the intermediate plate 120, the base plate 110, a rear curtain assembly 140, a front curtain assembly 150, a cam 160, a driver 170, a rear curtain lever 210, a front curtain lever 220, a rear curtain magnet 230, and a front curtain magnet 240.

The base plate 110 acts as a bottom of the focal plane shutter 100, and the front curtain assembly 150, the intermediate plate 120, the rear curtain assembly 140, and the cover plate 130 are sequentially disposed on a surface of the base plate 110. The cam 160, the driver 170, the rear curtain lever 210, the front curtain lever 220, the rear curtain magnet 230, and the front curtain magnet 240 are disposed on the other surface of the base plate 110. The base plate 110 fixes driver shafts of the rear curtain lever 210 and the front curtain lever 220 as will be described later. The intermediate plate 120 guides the rear curtain assembly 140 and the front curtain assembly 150 when the rear curtain assembly 140 and the front curtain assembly 150 move, and also prevents interference between the rear curtain assembly 140 and the front curtain assembly 150.

Guide grooves 112, 122, and 132 are respectively formed in the base plate 110, the intermediate plate 120, and the cover plate 130. A rear curtain pin 217 (see FIG. 11) of the rear curtain lever 210 and a front curtain pin 227 (see FIG. 11) of the front curtain lever 220 are inserted into the guide grooves 112, 122, and 132 so that the rear curtain assembly 140 and the front curtain assembly 150 are guided to move in certain directions. Also, through-holes 123 and 133 are respectively formed in the intermediate plate 120 and the cover plate 130, and rotation shafts (not shown) protruding from the driver 170 are inserted into the through-holes 123 and 133. The rear curtain assembly 140 and the front curtain assembly 150 rotate about the rotation shafts. Also, apertures 111, 121, and 131 are respectively formed in the base plate 110, the intermediate plate 120, and the cover plate 130, and an imaging device (not shown) is disposed behind the aperture 111 of the base plate 110. The apertures 111, 121, and 131 are opened and closed by the rear curtain assembly 140 and the front curtain assembly 150 as will be explained later in detail.

Meanwhile, a buffer member 250 may be further formed on the cover plate 130. The buffer member 250 is formed of an impact-absorbing material such as rubber, and reduces an impact when the rear curtain assembly 140 or the front curtain assembly 150 rotates.

The driver 170 includes a motor 171 and a worm drive (not shown), and is disposed on the base plate 110. In detail, the motor 171 is a power generating apparatus for generating a driving force for rotating the cam 160 that will be explained later. The worm drive includes two shafts perpendicular to each other, which respectively correspond to a worm having one or several threads and a worm wheel having teeth meshed with the worm. The worm wheel is similar to a helical gear, and angled teeth of the worm wheel are moved by threads of the worm. In the present embodiment, one or several threads are formed on an outer circumferential surface of the worm, and grooves are formed at regular intervals in an outer circumferential surface of the cam 160. The worm is coupled to a rotation shaft of the motor 171 to transmit a driving force generated by the motor 171 to the cam 160, and convert the driving force of the motor 171 into a force to rotate the cam 160. Since the focal plane shutter 100 of FIG. 1 uses a simple worm drive instead of a complicated gear train used in the prior art, the focal plane shutter 100 may have a simple structure and be easily controlled.

The cam 160 is disposed on the base plate 110, and rotates about a cam shaft. As described above, since the grooves engaged with the worm are formed in the outer circumferential surface of the cam 160 as described above, the cam 160 may rotate due to the driving force provided by the motor 171. Since a rear curtain controller 162 (see FIG. 9) and a front curtain controller 163 (see FIG. 9) are formed on a rear surface of the cam 160, the rear curtain assembly 140 and the front curtain assembly 150 may be controlled to be opened and closed according to the rotation of the cam 160. Such a relationship between the cam 160, the rear curtain assembly 140, and the front curtain assembly 150 will be explained later in detail.

Each of the rear curtain assembly 140 and the front curtain assembly 150 may be formed of cloths or metal curtains. The rear curtain assembly 140 and the front curtain assembly 150 are disposed adjacent to each other, and control the aperture 111 to open and close it. That is, when the rear curtain assembly 140 and the front curtain assembly 150 are disposed close to each other and there is no gap between the rear curtain assembly 140 and the front curtain assembly 150, the aperture 111 is closed, and when the rear curtain assembly 140 and the front curtain assembly 150 are spaced apart from each other, the aperture 111 is opened.

In this case, the rear curtain assembly 140 includes two wings, namely, a first rear curtain blade 141 and a second rear curtain blade 142 and two links, namely, a first rear curtain link 143 and a second rear curtain link 144; and the front curtain assembly 150 includes two wings, namely, a first front curtain blade 151 and a second front curtain blade 152 and two links, namely, a first front curtain link 153 and a second front curtain link 154. Although each of the rear curtain assembly 140 and the front curtain assembly 150 includes two wings and two links in FIG. 1, the present embodiment is not limited thereto. The number and shapes of wings and links may vary according to sizes, positions, and shapes of a shutter, an aperture, etc. As such, since each of the front curtain assembly 150 and the rear curtain assembly 140 includes only two or more wings, a shutter curtain structure may be simplified.

Also, although the rear curtain assembly 140 and the front curtain assembly 150 are disposed vertically adjacent to each other in FIG. 1, the present embodiment is not limited thereto, and the rear curtain assembly 140 and the front curtain assembly 150 may be disposed horizontally parallel to each other. However, since a vertical travel shutter travels along a shorter side of a screen than a horizontal travel shutter having to travel along a longer side, the vertical travel shutter has a shorter travel time and a higher shutter speed. Accordingly, a vertical travel shutter where the rear curtain assembly 140 and the front curtain assembly 150 are disposed vertically parallel to each other will be explained below. The rear curtain assembly 140 and the front curtain assembly 150 will be explained in detail with reference to FIGS. 3 through 8.

Meanwhile, the rear curtain lever 210 is disposed on the base plate 110, and is formed to rotate about a rear curtain lever shaft. The rear curtain lever 210 is disposed between the cam 160 and the rear curtain assembly 140, and transmits a rotation force of the cam 160 to the rear curtain assembly 140 so that the rear curtain assembly 140 rotates according to the rotation of the cam 160. Such a relationship between the cam 160, the rear curtain assembly 140, and the rear curtain lever 210 will be explained later in detail.

The front curtain lever 220 is disposed on the base late 110, and is formed to rotate about a front curtain lever shaft. The front curtain lever 220 is disposed between the cam 160 and the front curtain assembly 150, and transmits a rotation force of the cam 160 to the front curtain assembly 150 so that the front curtain assembly 150 rotates according to the rotation of the cam 160. Such a relationship between the cam 160, the front curtain assembly 150, and the front curtain lever 220 will be explained later in detail.

The rear curtain magnet 230 is formed at one side of the rear curtain lever 210, and the front curtain magnet 240 is formed at one side of the front curtain lever 220. When current flows through the magnets 230 and 240, which generate predetermined magnetic forces, the magnets 230 and 240 act as electromagnets. Thus, positions of the rear curtain lever 210 and the front curtain lever 220 are fixed due to the magnetic forces of the magnets 230 and 240, and thus the rear curtain assembly 140 and the front curtain assembly 150 are fixedly supported without being lowered due to their own weights.

The rear curtain assembly 140 and the front curtain assembly 150 of the focal plane shutter 100 of FIG. 1 will now be explained.

In detail, in a conventional focal plane shutter, a link and a blade are mostly coupled to each other by caulking. That is, each of a conventional rear curtain assembly and a conventional front curtain assembly includes 3 to 5 blades, and the blades are overlapped by adjusting a height of a caulking pin for receiving the blades. Here, the caulking pin has grooves into which the blades are fixedly inserted, and the caulking pin is compressed in such a manner that the blades are prevented from being separated from the grooves. In this case, the blades should maintain predetermined flatness in order to prevent local friction and scratch, and to this end, a precision machining technology is required. Accordingly, in order to manufacture the conventional rear curtain assembly and the conventional front curtain assembly constructed as described above, a number of processes are necessary and manufacturing costs are increased.

In order to solve these problems, in the focal plane shutter 100 of FIG. 1, since each of the rear curtain assembly 140 and the front curtain assembly 150 includes two blades and two links, and the blades and the links are coupled by using bosses and holes instead of using caulking, an increase in costs due to an increased number of processes is prevented, a precision machining technology is not necessary, and the reliability of the focal plane shutter 100 is ensured.

Figure 3:
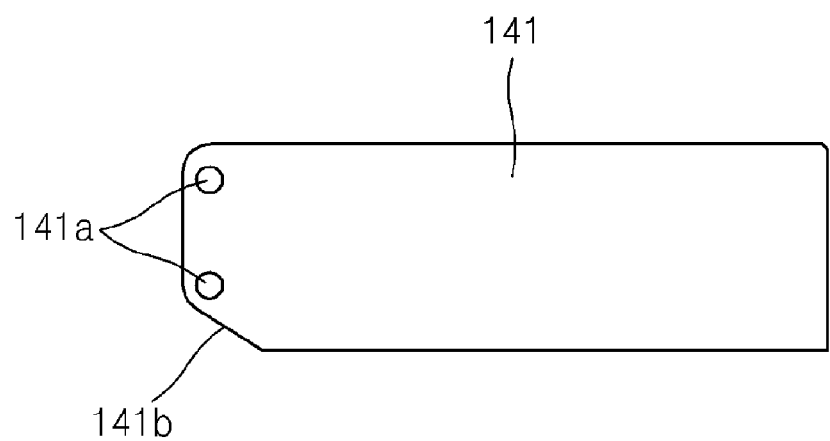
FIG. 3 is a view illustrating a first rear curtain blade of the focal plane shutter of FIG. 1, according to an embodiment.

FIG. 3 is a view illustrating the first rear curtain blade 141 of the focal plane shutter 100 of FIG. 1, according to an embodiment. Referring to FIG. 3, the first rear curtain blade 141 has a substantially flat rectangular shape, and holes 141*a* are formed at one or more sides of four sides. Here, a first boss 143*a* of the first rear curtain link 143 and a first boss 144*a* of the second rear curtain link 144 are inserted into the holes 141*a* (see FIG. 5). Meanwhile, in order to minimize friction and interference, chamfered portions 141*b* are formed at one or more edges of four edges of the first rear curtain blade 141.

Figure 4:
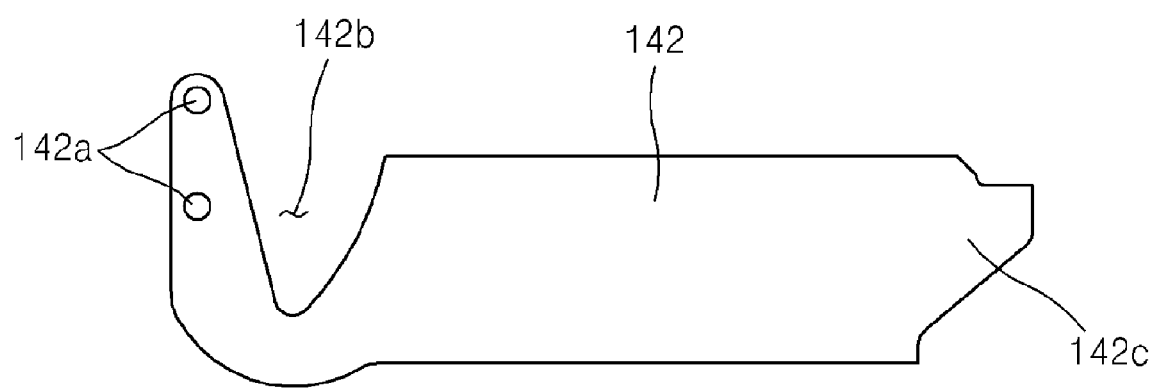
FIG. 4 is a view illustrating a second rear curtain blade of the focal plane shutter of FIG. 1, according to an embodiment.

FIG. 4 is a view illustrating the second rear curtain blade 142 of the focal plane shutter 100 of FIG. 1, according to an embodiment. Referring to FIG. 4, the second rear curtain blade 142 has a substantially flat rectangular shape, and holes 142*a* are formed at one or more sides of four sides. A second boss 143*b* of the first rear curtain link 143 and a second boss 144*b* of the second rear curtain link 144 are inserted into the holes 142*a* (see FIG. 5).

Meanwhile, an escape groove 142*b* is formed at an edge of the second rear curtain blade 142. In detail, in order to prevent overlapping between the first boss 143*a* of the first rear curtain link 143 and the first boss 144*a* of the second rear curtain link 144, the escape groove 142*b* is formed at a portion of the second rear curtain blade 142 where the first boss 143*a* of the first rear curtain link 143 and the first boss 144*a* of the second rear curtain link 144 move whereby at least one of the bosses 143*a* and 144*a* escape into the escape groove 142*b* as the bosses 143*a* and 144*a* rotate along paths about through-holes of the rear curtain links 143 and 144 at which the bosses 143*a* and 144*a* are respectively formed. Due to the escape groove 142*b*, the bosses 143*a*, 144*a* do not overlap with the second rear curtain blade 142 and it becomes possible to connect the curtain blades and curtain links by using bosses and holes.

Meanwhile, a buffer portion 142*c* protrudes from an edge opposite to the edge of the second rear curtain blade 142 at which the grooves 142*a* and the escape groove 142*b* are formed. The buffer portion 142*c* absorbs an impact applied to the second rear curtain blade 142, and prevents the second rear curtain blade 142 from being excessively deformed. That is, when the second rear curtain blade 142 rotates, the buffer portion 142*c* collides with the buffer member 250 (see FIG. 2), thereby reducing an impact applied to the rear curtain assembly 140.

Figure 5:
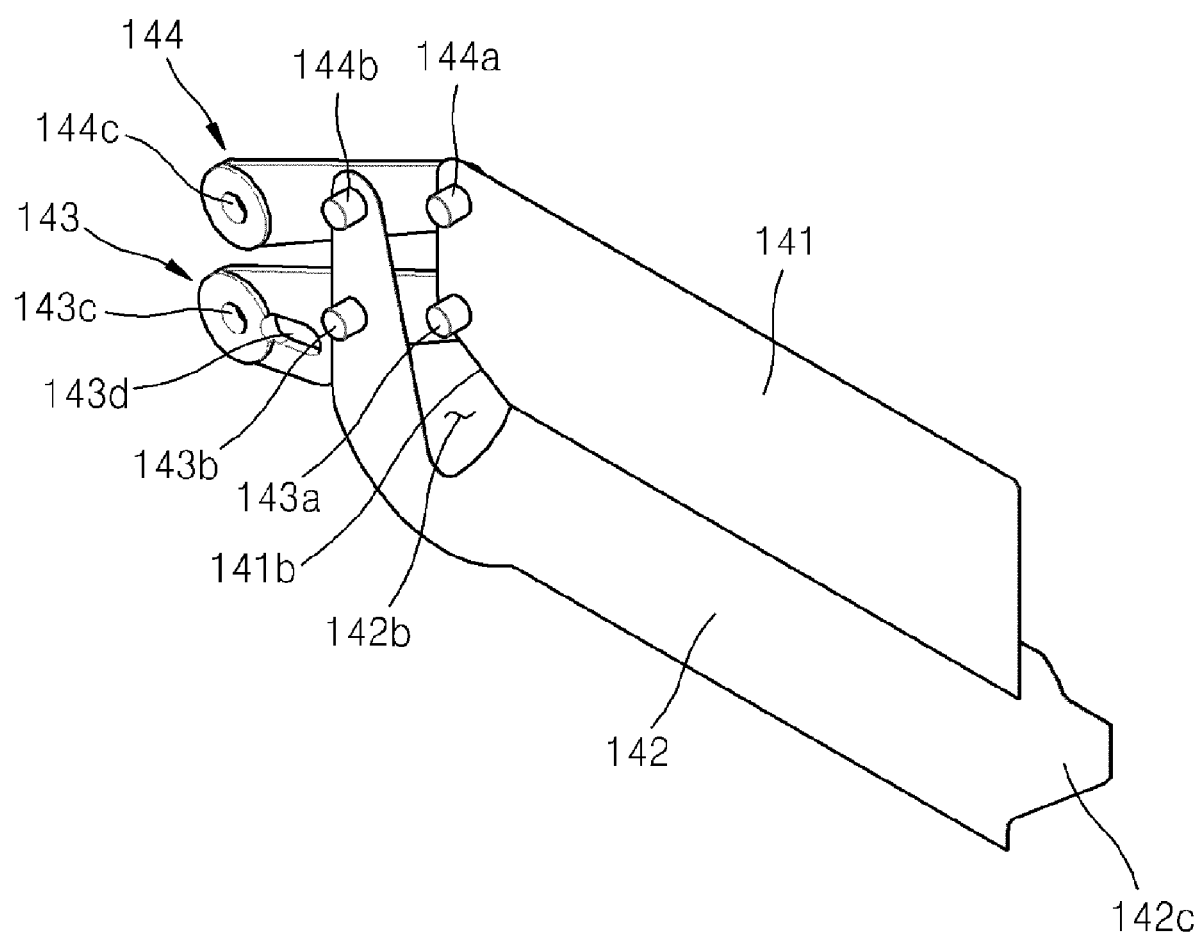
FIG. 5 is a perspective view illustrating a rear curtain assembly of the focal plane shutter of FIG. 1, according to an embodiment.

FIG. 5 is a perspective view illustrating the rear curtain assembly 140 of the focal plane shutter 100 of FIG. 1, according to an embodiment. Referring to FIG. 5, the first boss 143*a*, the second boss 143*b*, a through-hole 143*c*, and a guide groove 143*d* are formed in the first rear curtain link 143. The first boss 144*a*, the second boss 144*b*, and a through-hole 144*c* are formed in the second rear curtain link 144.

The first boss 143*a* of the first rear curtain link 143 and the first boss 144*a* of the second rear curtain link 144 are respectively inserted into the holes 141*a* (see FIG. 3) of the first rear curtain blade 141. The second boss 143*b* of the first rear curtain link 143 and the second boss 144*b* of the second rear curtain link 144 are respectively inserted into the holes 142*a* (see FIG. 4) of the second rear curtain blade 142.

Meanwhile, rotation shafts (not shown) protruding from the driver 170 are respectively inserted into the through-hole 143*c* of the first rear curtain link 143 and the through-hole 144*c* of the second rear curtain link 144, so that the first rear curtain link 143 and the second rear curtain link 144 rotate about the rotation shafts.

Meanwhile, the rear curtain pin 217 (see FIG. 11) of the rear curtain lever 210 (see FIG. 11), which will be explained later, is inserted into the guide groove 143*d* of the first rear curtain link 143. Accordingly, the rear curtain assembly 140 rotates due to the rotation of the rear curtain lever 210 (see FIG. 11).

Figure 6:
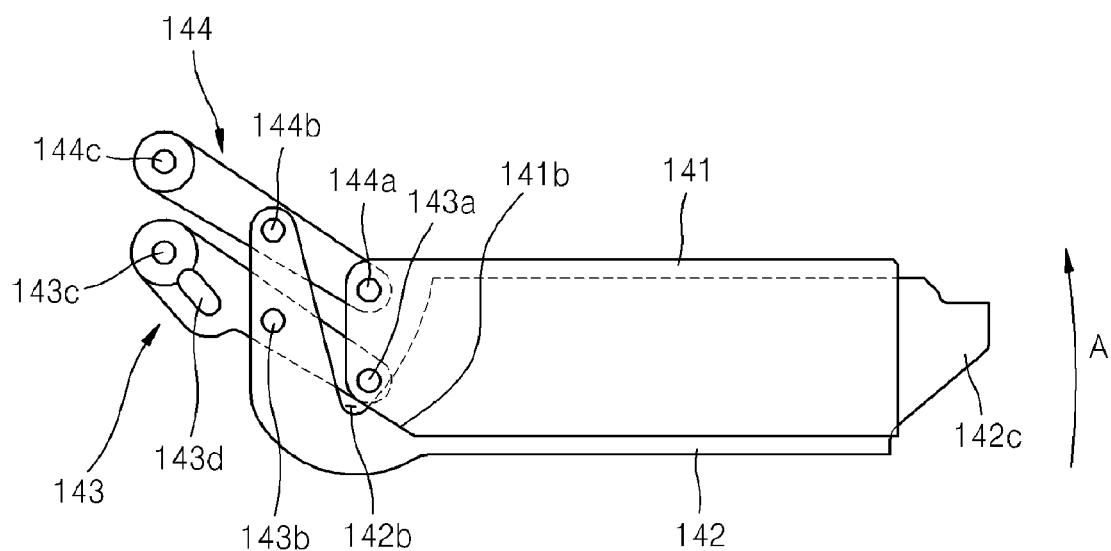
FIGS. 6 and 7 are views illustrating a case where the rear curtain assembly of the focal plane shutter of FIG. 1 rotates, according to an embodiment.
Figure 7:
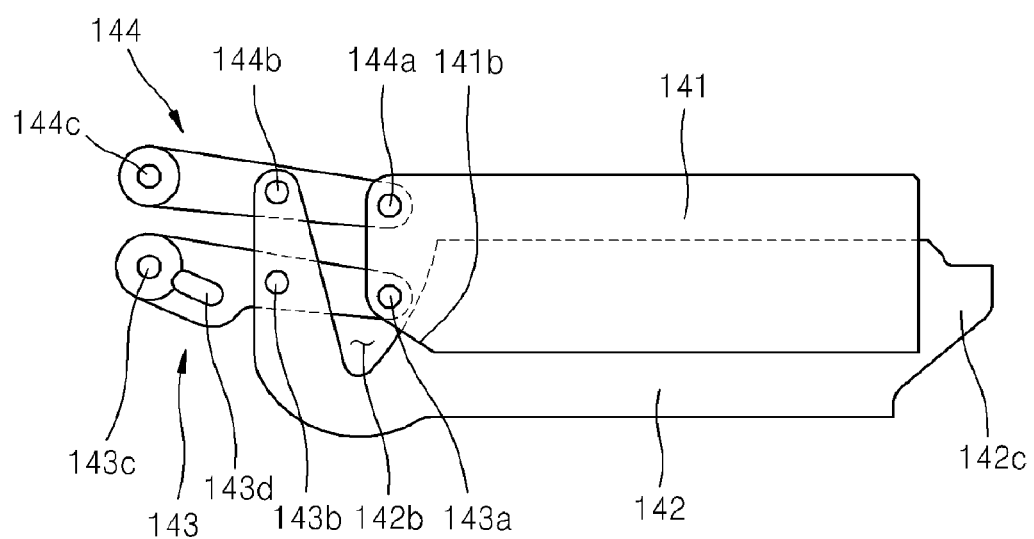

FIGS. 6 and 7 are views illustrating a case where the rear curtain assembly 140 of the focal plane shutter 100 of FIG. 1 rotates, according to an embodiment.

Referring to FIGS. 6 and 7, in a state where the rear curtain assembly 140 is disposed as shown in FIG. 6, when the rear curtain assembly 140 rotates in a direction indicated by arrow A of FIG. 6 about the rotation shaft (not shown) inserted into the through-hole 143c of the first rear curtain link 143 and the through-hole 144c of the second rear curtain link 144, the rear curtain assembly 140 reaches a state shown in FIG. 7. In this case, since the escape groove 142b is formed at the portion of the second rear curtain blade 142 where the first boss 143a of the first rear curtain link 143 and the first boss 144a of the second rear curtain link 144 rotate along paths about through-holes of the rear curtain links 143 and 144 at which the bosses 143a and 144a are respectively formed, the bosses 143a and 144a escape into the escape groove 142b as the bosses 143a and 144a rotate along paths about through-holes of the rear curtain links 143 and 144 at which the bosses 143a and 144a are respectively formed, wherein the bosses 143a and 144a do not contact the second rear curtain blade 142. Accordingly, the blades and the links may be coupled by using the bosses and the holes instead of using caulking without any mechanical interference.

In such a structure, since an additional caulking process for connecting the blades and the links of the rear curtain assembly 140 and the front curtain assembly 150 is not necessary, costs are reduced, and an additional jig for connecting the blades to a caulking pin is not necessary.

Figure 8:
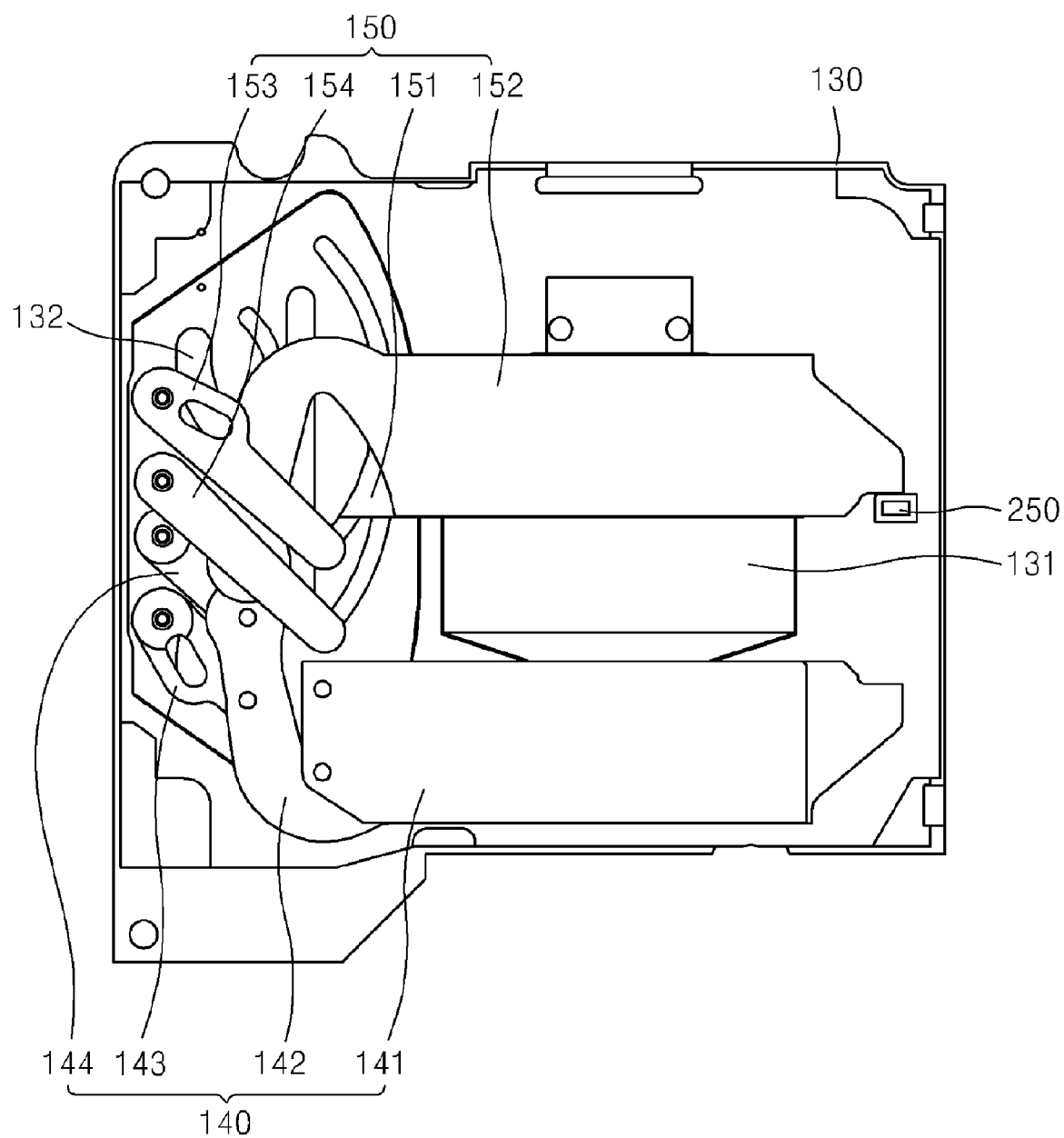
FIG. 8 is a view illustrating the rear curtain assembly and a front curtain assembly disposed on a cover plate of the focal plane shutter of FIG. 1, according to an embodiment.

FIG. 8 is a view illustrating the rear curtain assembly 140 and the front curtain assembly 150 disposed on the cover plate 130 of the focal plane shutter 100 of FIG. 1, according to an embodiment. Referring to FIG. 8, the rear curtain assembly 140 includes two wings, namely, the first rear curtain blade 141 and the second rear curtain blade 142, and two links, namely, the first rear curtain link 143 and the second rear curtain link 144 as described above. Also, the front curtain assembly 150 includes two wings, namely, the first front curtain blade 151 and the second front curtain blade 152, and two links, namely, the first front curtain link 153 and the second front curtain link 154. Here, a structure of the front curtain assembly 150 is the same as that of the rear curtain assembly 140, and thus a detailed explanation thereof will not be given.

As shown in FIG. 8, the rear curtain assembly 140 and the front curtain assembly 150 control the aperture 131 of the cover plate 130 to open and close it. That is, when both the rear curtain assembly 140 and the front curtain assembly 150 are raised or lowered, the aperture 131 is closed. However, when the rear curtain assembly 140 is lowered and the front curtain assembly 150 is raised, the aperture 131 is opened. The movements of the rear curtain assembly 140 and the front curtain assembly 150 are controlled by the cam 160 (see FIG. 1) connected to the driver 170 (see FIG. 1), and the rear curtain lever 210 and the front curtain lever 220 driven by the cam 160 (see FIG. 1), which will be explained below in detail.

First, a shape of the cam 160 of the focal plane shutter 100 of FIG. 1 will be explained.

Figure 9:
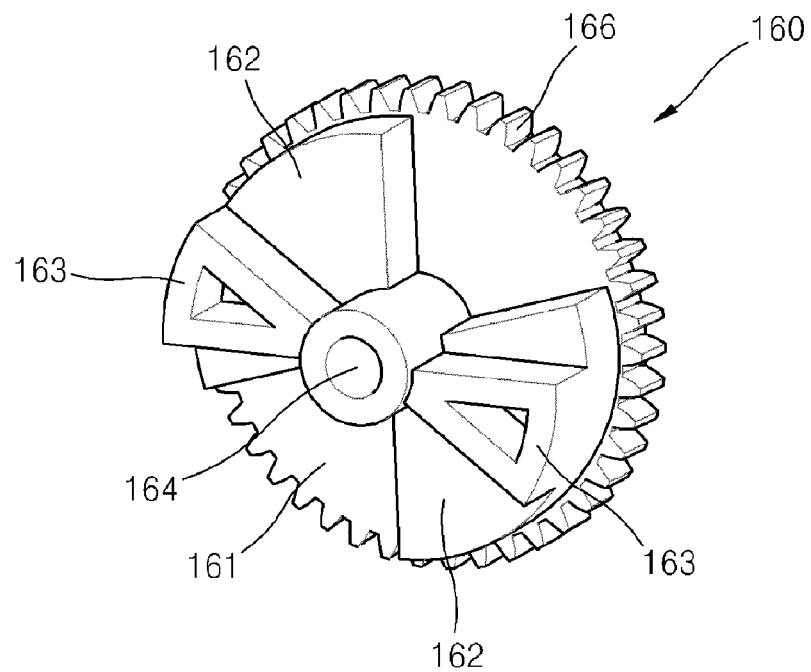
FIG. 9 is a rear perspective view illustrating a cam of the focal plane shutter of FIG. 1, according to an embodiment.
Figure 10:
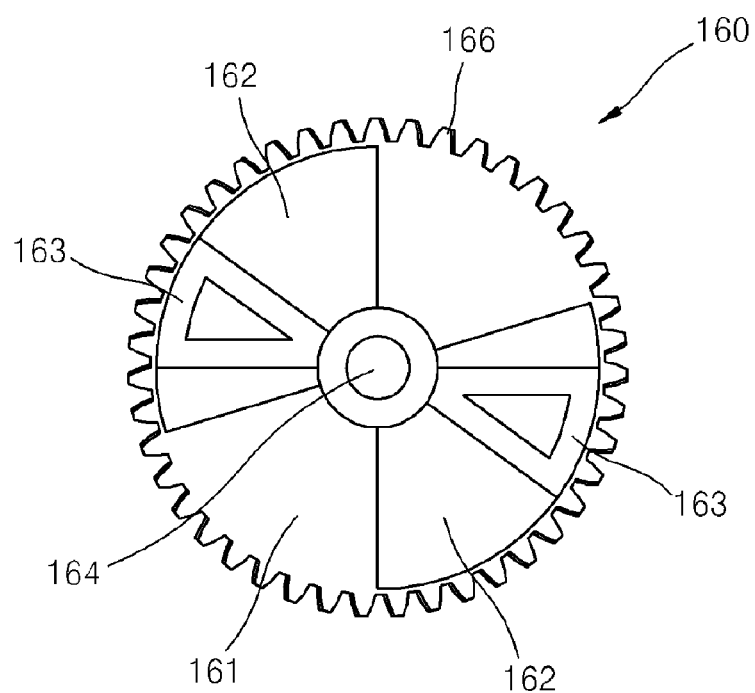
FIG. 10 is a rear view illustrating the cam of the focal plane shutter of FIG. 1, according to an embodiment.

FIG. 9 is a rear perspective view illustrating the cam 160 of the focal plane shutter 100 of FIG. 1, according to an embodiment. FIG. 10 is a rear view illustrating the cam 160 of the focal plane shutter 100 of FIG. 1, according to an embodiment.

Referring to FIGS. 9 and 10, the cam 160 of the focal plane shutter 100 of FIG. 1 includes a cam base 161, a rear curtain controller 162, and a front curtain controller 163. A hollow portion 164 is formed substantially in a center of the cam 160, and a cam shaft is inserted into the hollow portion 164. Accordingly, the cam 160 rotates about the cam shaft. Also, the cam 160 controls the rear curtain assembly 140 and the front curtain assembly 150 to open and close it.

In detail, the cam base 161 has a flat disk shape. Grooves 166 are formed at regular intervals in an outer circumferential surface of the cam base 161 having the disk shape. The grooves 166 are formed to engage with the threads of the worm, and convert a driving force of the motor 171 (see FIG. 2) into a force to rotate the cam 160.

The rear curtain controller 162 having a fan shape with a predetermined central angle is formed on the cam base 161. The front curtain controller 163 having a fan shape with a predetermined central angle is formed on the rear curtain controller 162. That is, the rear curtain controller 162 and the front curtain controller 163 are formed on the cam base 161 to have a height difference therebetween.

In this case, the rear curtain controller 162 and the front curtain controller 163 each having the fan shape are formed to have radiuses smaller than a radius of the cam base 161. The rear curtain controller 162 and the front curtain controller 163 may have substantially the same radius, but the present embodiment is not limited thereto. That is, as long as the rear curtain controller 162 and the front curtain controller 163 are formed to independently control the rear curtain assembly 140 and the front curtain assembly 150, respectively, the radiuses of the rear curtain controller 162 and the front curtain controller 163 may be freely set.

Also, although the central angle of the front curtain controller 163 is smaller than the central angle of the rear curtain controller 162 in FIGS. 9 and 10, the present embodiment is not limited thereto. That is, as long as the rear curtain controller 162 and the front curtain controller 163 are formed to independently control the rear curtain assembly 140 and the front curtain assembly 150, respectively, the central angles of the rear curtain controller 162 and the front curtain controller 163 may be freely set.

As shown in FIGS. 9 and 10, since the rear curtain controller 162 and the front curtain controller 163 are formed to have a height difference therebetween, the rear curtain controller 162 and the front curtain controller 163 may independently control the rear curtain assembly 140 and the front curtain assembly 150 to be opened and closed. As such, since the rear curtain assembly 140 and the front curtain assembly 150 are controlled to be opened and closed with only the cam 160, the focal plane shutter 100 has a simple structure and may be easily manufactured.

Meanwhile, although not shown, a contact switch may be further formed on one surface of the cam 160, and may control a rotation angle of the cam 160.

Figure 11:
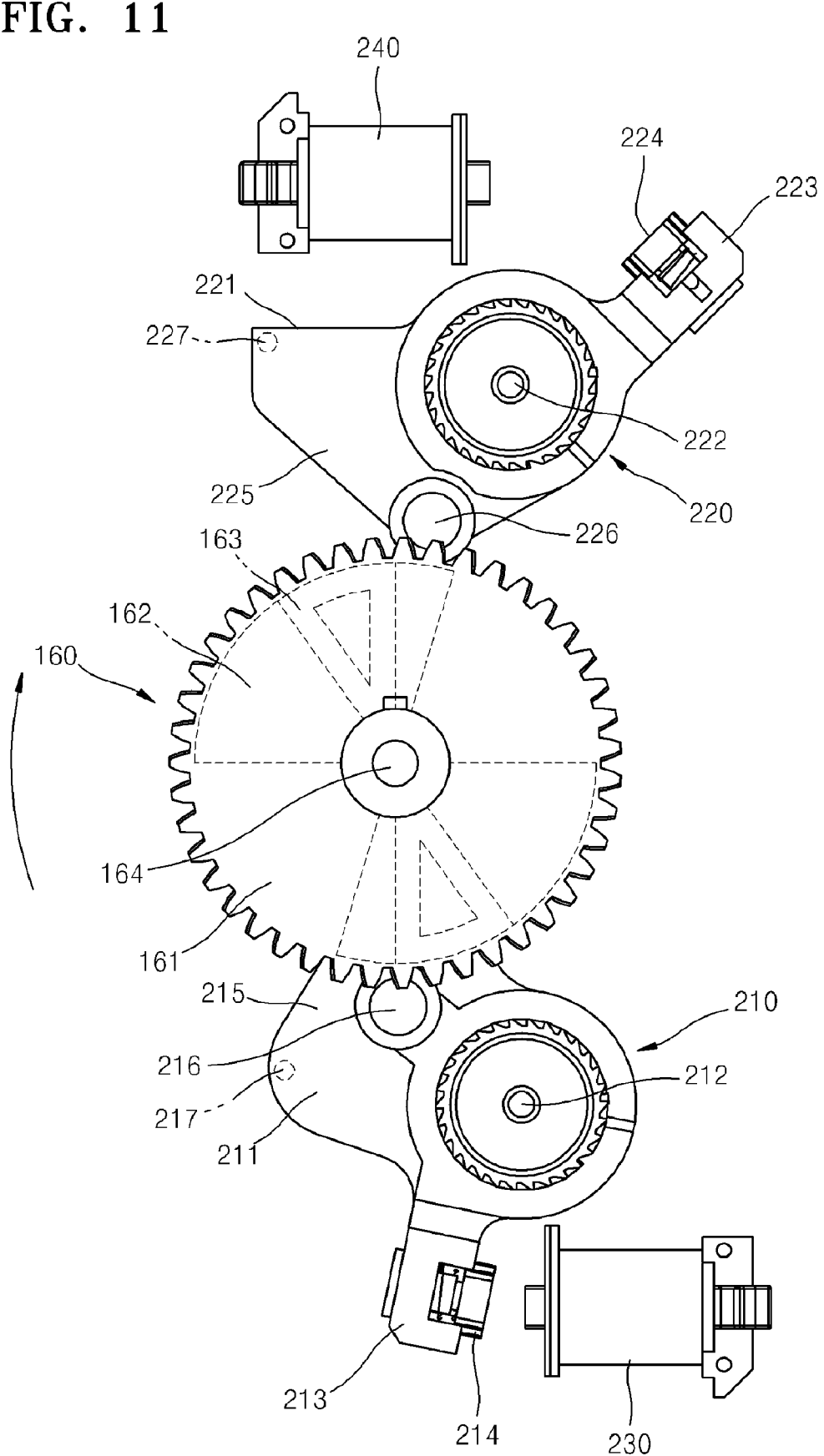
FIG. 11 is a rear view illustrating the cam, a rear curtain lever, a rear magnet, a front curtain lever, and a front curtain magnet of the focal plane shutter of FIG. 1, according to an embodiment.

FIG. 11 is a rear view illustrating the cam 160, the rear curtain lever 210, the rear curtain magnet 230, the front curtain lever 220, and the front curtain magnet 240 of the focal plane shutter 100 of FIG. 1, according to an embodiment.

Referring to FIG. 11, the rear curtain lever 210 of the focal plane shutter 100 of FIG. 1 includes a base 211, a rear curtain lever shaft 212, a first end portion 213, a magnetic body 214, a second end portion 215, and a cam roller 216. The rear curtain lever 210 is disposed between the cam 160 and the rear curtain assembly 140 (see FIG. 1), and transmits a rotation force of the cam 160 to the rear curtain assembly 140 so that the rear curtain assembly 140 rotates according to the rotation of the cam 160.

In detail, the rear curtain lever 210 is disposed at one side of the cam 160 on the base plate 110 (see FIG. 1), and is formed to rotate about the rear curtain lever shaft 212. That is, the base 211 having a flat disk shape and the first end portion 213 and the second end portion 215 extending in different directions from the base 211 are formed to rotate about the rear curtain lever shaft 212.

In this case, a rear curtain spring (not shown) may be further formed on the rear curtain lever shaft 212. The rear curtain spring may continuously provide a predetermined elastic force to the rear curtain lever 210 so that the rear curtain lever 210 rotates about the rear curtain lever shaft 212 in one direction. Accordingly, in all cases except for a case where the rear curtain lever 210 is supported by the rear curtain controller 162 of the cam 160 or is fixed by the rear curtain magnet 230, the rear curtain lever 210 receives an elastic force to rotate in a certain direction.

The first end portion 213 extends from the base 211 away from the cam 160, in other words, toward the rear curtain magnet 230. The magnetic body 214 is provided at one side of the first end portion 213. Accordingly, when current flows through the rear curtain magnet 230, which generates a predetermined magnetic force, the rear curtain magnet 230 acts as an electromagnet, and the magnetic body 214 is magnetically coupled to the rear curtain magnet 230 which acts as the electromagnet. Accordingly, the rear curtain assembly 140 (see FIG. 1) is fixedly supported without being lowered due to its own weight.

The second end portion 215 extends from the base 211 toward the cam 160. The cam roller 216 is provided at one side of the second end portion 215. As shown in FIG. 11, the cam roller 216 has a cylindrical shape, and is formed in such a manner that an outer circumferential surface of the cam roller 216 having the cylindrical shape contacts an outer circumferential surface of the rear curtain controller 162 having the fan shape. That is, the cam roller 216 may contact the rear curtain controller 162 and may not contact the front curtain controller 163 from among the rear curtain controller 162 and the front curtain controller 163 which have a height difference therebetween. In this structure, the rear curtain lever 210 may be controlled by the rear curtain controller 162.

The rear curtain pin 217 may be formed on a rear surface of the base 211. The rear curtain pin 217 is sequentially inserted into a respective one of the guide grooves 132 (see FIG. 1) of the cover plate 130, a respective one of the guide grooves 122 (see FIG. 2) of the intermediate plate 120, the guide groove 143d (see FIG. 5) of the first rear curtain link 143, and a respective one of the guide grooves 112 (see FIG. 1) of the base plate 110. Accordingly, when the motor 171 (see FIG. 2) rotates, the cam 160 may rotate accordingly, and when the cam 160 rotates, the rear curtain lever 210 may rotate accordingly, and when the rear curtain lever 210 rotates, the rear curtain assembly 140 (see FIG. 1) may rotate accordingly.

Meanwhile, the front curtain lever 220 of the focal plane shutter 100 of FIG. 1 includes a base 221, a front curtain lever shaft 222, a first end portion 223, a magnetic body 224, a second end portion 225, a cam roller 226, and a front curtain pin 227. The front curtain lever 220 is disposed between the cam 160 and the front curtain assembly 150 (see FIG. 1), and transmits a rotation force of the cam 160 to the front curtain assembly 150 so that the front curtain assembly 150 rotates according to the rotation of the cam 160. A structure of the front curtain lever 220 is substantially the same as that of the rear curtain lever 210, and thus a detailed explanation thereof will not be given.

Operations of the cam 160 and the rear curtain lever 210 of the focal plane shutter 100 of FIG. 1 will now be explained.

In a state where the cam roller 216 of the rear curtain lever 210 does not contact the rear curtain controller 162 of the cam 160, the rear curtain spring (not shown) provides a predetermined elastic force to the rear curtain lever 210 so that the rear curtain lever 210 rotates clockwise. Accordingly, the rear curtain lever 210 is spaced apart by a predetermined interval from the rear curtain magnet 230.

In this state, when the motor 171 (see FIG. 2) is driven, the cam 160 rotates clockwise. Then, the rear curtain controller 162 of the cam 160 rotates to raise the cam roller 216, and thus the rear curtain lever 210 rotates counterclockwise about the rear curtain lever shaft 212. In this state, when the motor 171 is continuously driven and thus the cam 160 continuously rotates clockwise, the cam roller 216 is located at an arc portion of the rear curtain controller 162. In this state, the magnetic body 214 provided on the first end portion 213 of the rear curtain lever 210 contacts the rear curtain magnet 230.

In this state, when the motor 171 (see FIG. 2) is continuously driven, the cam 160 continuously rotates clockwise. Then, when the cam 160 rotates to an extent that the arc portion of the rear curtain controller 162 no longer supports the cam roller 216, the rear curtain lever 210 rotates clockwise due to a predetermined elastic force provided by the rear curtain spring and returns to its original state.

As such, while the cam 160 rotates, a position of the rear curtain lever 210 is controlled according to whether the rear curtain controller 162 contacts the cam roller 216 and supports the cam roller 216, and a position of the rear curtain assembly 140 (see FIG. 1) is controlled by the position of the rear curtain lever 210. That is, while the cam roller 216 contacts the arc portion of the rear curtain controller 162, the rear curtain lever 210 is supported by the cam 160, and the rear curtain magnet 230 and the magnetic body 214 of the rear curtain lever 210 contact each other (this state is referred to as a charge state). On the other hand, while the cam roller 216 does not contact the arc portion of the rear curtain controller 162, the rear curtain lever 210 is not supported by the cam 160, and the rear curtain magnet 230 and the magnetic body 214 of the rear curtain lever 210 are spaced apart from each other (this state is referred to as a free state).

That is, the rear curtain assembly 140 is repeatedly opened and closed while the cam 160 rotates in a certain direction, and thus the rear curtain assembly 140 may be controlled to be opened and closed according to the rotation angle of the cam 160. Meanwhile, an operation of the front curtain assembly 150 may be performed under a substantially same mechanism as that of the rear curtain assembly 140.

According to various embodiments, since an additional caulking process for connecting blades and links of a rear curtain assembly and a front curtain assembly is unnecessary, the number of processes is reduced, and an additional jig for connecting the blades to a caulking pin is unnecessary. Also, since the number of the blades constituting each of the rear curtain assembly and the front curtain assembly is 2, the number of processes is reduced, manufacturing costs are reduced, and easy manufacture is facilitated. Also, since the rear curtain assembly and the front curtain assembly may be controlled to be opened and closed with one cam only, the focal plane shutter may have a simple structure and may be easily manufactured.

As described above, according to various embodiments, the focal plane shutter has a simple structure, is easily manufactured and controlled, and provides a live view function.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A focal plane shutter comprising:
   a front curtain assembly comprising two or more front curtain links and two or more front curtain blades, wherein bosses are formed at one of the front curtain links and the front curtain blades, holes are formed in the remaining one of the front contain links and the front curtain blades, and the bosses are inserted into the holes; and
   a rear curtain assembly comprising two or more rear curtain links and two or more rear curtain blades, wherein bosses are formed at one of the rear curtain links and the rear curtain blades, holes are formed in the remaining one of the rear curtain links and the rear curtain blades, and the bosses are inserted into the holes,
   wherein at least one of the front curtain blades comprises a front curtain escape groove formed to avoid a path along which the bosses of the front curtain assembly moves while the front curtain links are rotating, and
   at least one of the rear curtain blades comprises a rear curtain escape groove formed to avoid a path along which the bosses of the rear curtain assembly moves while the rear curtain links are rotating.

2. The focal plane shutter of claim 1, wherein rotation paths of the bosses formed in the front curtain assembly do not overlap with one another, and rotation paths of the bosses formed in the rear curtain assembly do not overlap with one another.

3. The focal plane shutter of claim 1, wherein the front curtain assembly and the rear curtain blades are independently driven.

4. A focal plane shutter comprising:
   a front curtain assembly comprising two or more front curtain links having surfaces on which a plurality of bosses are formed and two or more front curtain blades having surfaces in which a plurality of holes are formed, wherein the bosses are inserted into the holes; and
   a rear curtain assembly comprising two or more rear curtain links having surfaces on which a plurality of bosses are formed and two or more rear curtain blades having surfaces in which a plurality of holes are formed, wherein the bosses are inserted into the holes,
   wherein the two or more front curtain blades are disposed on different planes, at least one of the front curtain blades comprises a front curtain escape groove formed to avoid a path along which the bosses of the front curtain assembly moves while the front curtain links are rotating, and
   the two or more rear curtain blades are disposed on different planes, at least one of the rear curtain blades includes a rear curtain escape groove formed to avoid a path along which the bosses of the rear curtain assembly moves while the rear curtain links are rotating.

5. The focal plane shutter of claim 4, wherein the front curtain assembly comprises a first front curtain blade and a second front curtain blade which are disposed parallel to each other, and a first front curtain link and a second front curtain link which are disposed parallel to each other.

6. The focal plane shutter of claim 5, wherein a plurality of bosses formed on the first front curtain link are inserted into holes formed in the first front curtain blade and holes formed in the second front curtain blade, and
   a plurality of bosses formed on the second front curtain link are inserted into holes formed in the first front curtain blade and holes formed in the second front curtain blade.

7. The focal plane shutter of claim 5, wherein chamfered portions are formed at one or more edges of the first front curtain blade.

8. The focal plane shutter of claim 5, wherein the front curtain escape groove is formed in the second front curtain blade.

9. The focal plane shutter of claim 8, wherein the front curtain escape groove is formed at a portion of the second front curtain blade along the path where the boss of the first front curtain blade rotates.

10. The focal plane shutter of claim 9, wherein the front curtain escape groove is formed at rotation paths of the bosses of the first front curtain link inserted into the holes of the first front curtain blade and the bosses of the second front curtain link inserted into the holes of the first front curtain blade, so that the bosses of the first front curtain link and the bosses of the second front curtain link do not contact the second front curtain blade.

11. The focal plane shutter of claim 5, wherein the first front curtain link and the second front curtain link rotate by a same angle.

12. The focal plane shutter of claim 5, wherein the first front curtain blade, the second front curtain blade, the first front curtain link, and the second front curtain link constitute a 4-bar mechanism.

13. The focal plane shutter of claim 4, further comprising a buffer member formed to contact at least one of the front curtain blades, wherein a protrusion is formed at one end portion of at least one of the front curtain blades to contact the buffer member.

14. The focal plane shutter of claim 4, further comprising:
a cam that controls the front curtain assembly and the rear curtain assembly to independently move;
a front curtain lever interposed between the front curtain assembly and the cam, and designed to transmit a movement of the cam to the front curtain assembly; and
a rear curtain lever interposed between the rear curtain assembly and the cam, and designed to transmit a movement of the cam to the rear curtain assembly.

15. The focal plane shutter of claim 14, wherein the front curtain lever and the rear curtain lever independently rotate according to a rotation of the cam.

16. The focal plane shutter of claim 14, wherein the cam comprises a front curtain controller and a rear curtain controller having a height difference therebetween,
wherein the front curtain controller controls a position of the front curtain lever and the rear curtain controller controls a position of the rear curtain lever.

17. The focal plane shutter of claim 16, wherein the cam rotates in one direction,
wherein, while the cam rotates in the one direction, the front curtain assembly opens or closes the shutter according to relative positions of the front curtain controller and the front curtain lever, and the rear curtain assembly opens or closes the shutter according to relative positions of the rear curtain controller and the rear curtain lever.

18. The focal plane shutter of claim 14, wherein the cam comprises a front curtain controller having a fan shape with a first central angle, and a rear curtain controller having a fan shape with a second central angle.

19. The focal plane shutter of claim 18, wherein the first central angle of the front curtain controller and the second central angle of the rear curtain controller are different from each other.

20. The focal plane shutter of claim 18, wherein the front curtain controller and the rear curtain controller are formed to have a height difference therebetween, and respectively control rotations of the front curtain assembly and the rear curtain assembly.

21. The focal plane shutter of claim 20, wherein the front curtain controller contacts the front curtain lever and the rear curtain controller contacts the rear curtain lever.

22. The focal plane shutter of claim 21, wherein, while the front curtain lever contacts an arc portion of the front curtain controller, the front curtain lever is fixedly supported without rotating, and
while the rear curtain lever contacts an arc potion of the rear curtain controller, the rear curtain lever is fixedly supported without rotating.

23. The focal plane shutter of claim 21, wherein a front curtain magnet is further formed at one side of the front curtain lever, and while the front curtain lever contacts an arc portion of the front curtain controller, the front curtain lever contacts the front curtain magnet, and
a rear curtain magnet is further formed at one side of the rear curtain lever, and while the rear curtain lever contacts an arc portion of the rear curtain control unit, the rear curtain lever contacts the rear curtain magnet.

24. The focal plane shutter of claim 14, further comprising a motor that provides a predetermined driving force,
wherein the cam rotates in one direction due to the driving force provided by the motor.

25. The focal plane shutter of claim 24, wherein a worm drive is coupled to the motor, grooves engaged with the worm drive are formed at regular intervals in an outer circumferential surface of the cam, and the driving force of the motor is converted into a force to rotate the cam.

26. An imaging apparatus comprising:
a lens on which light is incident;
an imaging device which converts the incident light into an electrical signal;
a display unit on which an image captured by the imaging device is displayed; and
the focal plane shutter of claim 25, the focal plane shutter being interposed between the lens and the imaging device and designed to adjust the amount of light incident on the imaging device.

* * * * *